(12) United States Patent
Ueda et al.

(10) Patent No.: US 7,033,687 B2
(45) Date of Patent: Apr. 25, 2006

(54) FUEL CELL POWER GENERATION SYSTEM AND METHOD OF CONTROLLING FUEL CELL POWER GENERATION

(75) Inventors: Tetsuya Ueda, Kasugai (JP); Shinji Miyauchi, Nara (JP); Masataka Ozeki, Izumi (JP); Tomonori Asou, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 435 days.

(21) Appl. No.: 10/247,014

(22) Filed: Sep. 19, 2002

(65) Prior Publication Data
US 2003/0068540 A1  Apr. 10, 2003

(30) Foreign Application Priority Data
Sep. 19, 2001 (JP) ............................. 2001-285422
Feb. 7, 2002 (JP) ............................. 2002-031494

(51) Int. Cl.
*H01M 8/18* (2006.01)
(52) U.S. Cl. ............................. 429/19; 429/13; 429/17; 429/40
(58) Field of Classification Search ............. 429/13, 429/17, 40, 19
See application file for complete search history.

(56) References Cited

U.S. PATENT DOCUMENTS

| | | | |
|---|---|---|---|
| 4,820,594 A | | 4/1989 | Sugita et al. |
| 4,965,143 A | * | 10/1990 | Mizuno et al. ............... 429/17 |
| 5,006,425 A | | 4/1991 | Takabayashi et al. |
| 5,178,969 A | | 1/1993 | Amemiya |
| 5,462,815 A | * | 10/1995 | Horiuchi ...................... 429/13 |
| 6,821,494 B1 | * | 11/2004 | Zhu et al. ..................... 422/194 |
| 2002/0071975 A1 | | 6/2002 | Takashi |

FOREIGN PATENT DOCUMENTS

| | | | |
|---|---|---|---|
| JP | 57-212774 A | | 12/1982 |
| JP | 62-184774 | | 8/1987 |
| JP | 02-197058 | | 8/1990 |
| JP | 02-234360 A | | 9/1990 |
| JP | 03-163762 A | | 7/1991 |
| JP | 3-257762 | | 11/1991 |
| JP | 04-071169 | | 3/1992 |
| JP | 2001-189161 A | * | 7/2001 |
| JP | 2001-189165 A | | 7/2001 |
| JP | 2001-354401 | | 12/2001 |
| JP | 2002-179401 | | 6/2002 |

OTHER PUBLICATIONS

European Search Report for EP 02 02 1301, dated Feb. 11, 2004.
Japanese Office Action for 2003-031627, dated Jun. 21, 2005.

* cited by examiner

Primary Examiner—Dah-Wei Yuan
(74) Attorney, Agent, or Firm—RatnerPrestia

(57) ABSTRACT

A fuel cell power generation system has inert gas supply means of supplying a particular inert gas at least to the reformer; and alternative gas supply means of supplying an alternative gas other than the particular inert gas at least to the reformer, wherein when the operation of the fuel cell is stopped, the alternative gas supply means is used to discharge hydrogen rich gas staying at least in the reformer if the stop of the operation of the fuel cell is an ordinary stop, and the inert gas supply means is used to perform the discharge if the stop of the operation of the fuel cell is an emergency stop.

13 Claims, 11 Drawing Sheets

FUEL CELL POWER GENERATION SYSTEM AND METHOD OF CONTROLLING FUEL CELL POWER GENERATION

BACKGROUND OF THE INVENTION

1. Field of the Invention

The present invention relates to a fuel cell power generation system and method which generates power by causing a hydrogen rich gas produced from a raw material gas and an oxidizer gas to react with each other.

2. Related Art of the Invention

A conventional fuel cell power generation system such as one disclosed in Japanese Patent Laid-Open No. 3-257762 has a configuration shown in FIG. 10. The fuel cell power generation system shown in FIG. 10 has a reformer 41 which forms a hydrogen rich gas from a raw material gas, a burner 42 which heats the reformer 41, a nitrogen facility 46 which is connected to a line on the upstream side of the reformer 41 through nitrogen supply pipes 44 and shutoff valves 45, and a fuel cell 43 which is connected to the reformer 41 on the downstream side of the same through a reformed gas supply pipe 47, and which generates power by causing oxygen in air and generated hydrogen to react with each other. A downstream port of the fuel cell 43 on the fuel electrode 43a side is connected to the burner 42 through a hydrogen discharge connection pipe 48.

In ordinary fuel cell power generation systems, supply of a raw material gas is first stopped when the operation is stopped. When raw material gas supply is stopped, hydrogen rich gas stays in a channel comprised of the reformer 41-reformed gas supply pipe 47-fuel cell 43 fuel electrode 43a-hydrogen discharge connection pipe 48. If air flows from the burner 42 opened to atmosphere into the hydrogen rich gas channel by free convection, there is a risk of hydrogen reacting vigorously with oxygen.

When the operation is stopped, the shutoff valve 45 is opened to supply nitrogen as an inert gas to a channel comprised of the reformer 41-reformed gas supply pipe 47-fuel cell 43 fuel electrode 43a-hydrogen discharge connection pipe 48 from the nitrogen facility 46 through the nitrogen supply pipes 44 to entirely discharge hydrogen rich gas, as in this conventional fuel cell power generation system. The discharge hydrogen rich gas is burnt in the burner 42.

Thus, in the conventional fuel cell power generation system, each time the operation is stopped, the purging operation using nitrogen is performed to prevent hydrogen and air from directly reacting with each other, thus ensuring safety.

The conventional fuel cell power generation system needs to be equipped with the nitrogen facility 46 including a large nitrogen cylinder for the nitrogen-charging purging performed at every suspension of operation. For example, if the generation system is applied to an independent stationary home generator, an electric vehicle power supply or the like, a considerably large space for installation of the system is required and the initial cost for equipment is considerably high. Also, there is a need to periodically replace the nitrogen cylinder or replenish nitrogen and to take the corresponding running cost into consideration.

To solve this problem, a method not using a nitrogen cylinder may be used to discharge hydrogen rich gas staying in the channel. In such a case, however, a complicated control procedure is required and it is difficult to continuously discharge hydrogen rich gas staying in the channel in the event of an emergency, for example, a system failure. In such a situation, hydrogen rich gas stays in the channel and it is not possible to ensure sufficient level of safety from the risk of oxidization reaction of hydrogen gas.

SUMMARY OF THE INVENTION

In view of the above-described problems of the conventional art, an object of the present invention is to provide a fuel cell power generation system and method in which the necessary inert gas supply means is minimized in size, etc., while safety from the risk relating to residual hydrogen rich gas is ensured, which can be installed in a reduced space, and which is arranged so as to reduce the initial cost and running cost.

One aspect of the present invention is a fuel cell power generation system comprising:

a reformer which generates a hydrogen rich gas from a raw material gas supplied from a raw material gas supply means;

a fuel cell in which the hydrogen rich gas generated in said reformer and an oxidizer gas are caused to react with each other to generate electric power;

inert gas supply means of supplying a particular inert gas at least to said reformer; and alternative gas supply means of supplying an alternative gas other than said particular inert gas at least to said reformer, wherein when the operation of said fuel cell is stopped, said alternative gas supply means is used to discharge hydrogen rich gas staying at least in said reformer if the stop of the operation of said fuel cell is an ordinary stop, and said inert gas supply means is used to perform said discharge if the stop of the operation of said fuel cell is an emergency stop.

Another aspect of the present invention is the fuel cell power generation system, further comprising abnormality detection means of detecting an abnormality in said alternative gas supply means, wherein when said abnormality detection means detects an abnormality, said emergency stop is made and said inert gas supply means is used to perform said discharge.

Still another aspect of the present invention is the fuel cell power generation system, wherein said alternative gas supply means includes air supply means of supplying air at least to said reformer and uses a water vapor generator which supplies water vapor for reforming reaction to said reformer, and wherein after supply of the raw material gas to said reformer has been stopped, water vapor supplied from said water vapor generator and purging air supplied from said air supply means are caused to flow in this order to perform said discharge.

Yet still another aspect of the present invention is the fuel cell power generation system, further comprising a bypass line through which hydrogen rich gas output from said reformer is discharged without being passed through said fuel cell, switching means of selecting one of said bypass line and said fuel cell as a destination to which the gas from said reformer is output, and a fuel cell raw material gas supply means of directly supplying said raw material gas to said fuel cell, wherein when said discharge is performed said switching means selects said bypass line, discharge of hydrogen rich gas in said reformer is performed, and said fuel cell raw material gas supply means supplies said raw material gas to said fuel cell to discharge residual hydrogen in said fuel cell.

Still yet another aspect of the present invention is the fuel cell power generation system, further comprising a bypass line through which hydrogen rich gas output from said reformer is discharged without being passed through said fuel cell, and switching means of selecting one of said bypass line and said fuel cell as a destination to which the gas from said reformer is output, wherein when said discharge is performed said switching means selects said bypass line, discharge of hydrogen rich gas in said reformer is performed, and a fuel electrode and an oxygen electrode of said fuel cell are electrically connected through a resistor to cause residual hydrogen in said fuel cell to react with said oxidizer gas to be consumed.

A further aspect of the present invention is a fuel cell power generation system, further comprising a temperature detector which detects the temperature of said reformer, wherein when the operation of said fuel cell power generation system is stopped during starting operation of said fuel cell power generation system and before said fuel cell starts generating power, said alternative gas supply means operates to perform said discharge by using said water vapor and said air if the temperature of said reformer is equal to or higher than a predetermined temperature, and said discharge is performed only by the purging air supplied from said air supply means if the temperature of said reformer is smaller than the predetermined temperature.

A still further aspect of the present invention is the fuel cell power generation system, wherein at least one of the gas discharged line for the hydrogen rich gas used during reaction in said fuel cell and the bypass line is connected to a burner for heating said reformer, and a burnable gas discharged at the time of shutdown is burnt in said burner.

A yet further aspect of the present invention is the fuel cell power generation system, further comprising a shifter which is provided between said reformer and said fuel cell and which removes carbon monoxide, wherein a catalyst containing at least one of platinum, ruthenium, rhodium, and palladium is provided in said shifter.

A still yet further aspect of the present invention is the fuel cell power generation system, wherein at the time of said emergency stop, information about the emergency stop is communicated to a maintenance manager or a maintenance company in charge of maintenance of said fuel cell power generation system.

An additional aspect of the present invention is a method of controlling a fuel cell power generation system having a reformer which generates a hydrogen rich gas from a raw material gas supplied from a raw material gas supply means, and a fuel cell in which the hydrogen rich gas generated in said reformer and an oxidizer gas are caused to react with each other to generate electric power, wherein said method comprising:

an inert gas supply step of supplying a particular inert gas at least to the reformer; and an alternative gas supply step of supplying an alternative gas other than said particular inert gas at least to said reformer, wherein when the operation of said fuel cell is stopped, hydrogen rich gas staying at least in said reformer is discharged by using the inert gas supplied by said inert gas supply step or the alternative gas supplied by said alternative gas supply step.

A fuel cell power generation system comprising:
a reformer which generates a hydrogen rich gas from a raw material by reforming reaction;

raw material supply means of supplying the raw material to the reformer;

temperature control means of controlling the temperature of the reformer so as to promote the reforming reaction;

first air supply means of supplying air to the reformer;

temperature detection means of detecting the temperature of the reformer;

a fuel cell in which electric power is generated by using the hydrogen rich gas; and control means of controlling the operations of the reformer, the raw material supply means, the first air supply means, the temperature control means and the fuel cell on the basis of the temperature detected by the temperature detection means, wherein when the operation of the fuel cell is stopped, the control means performs such control that the temperature of the reformer is equal to or lower than a predetermined temperature, while at least the raw material supply means is continuing supply of the raw material, wherein when the temperature of the reformer becomes equal to the predetermined temperature, and when the hydrogen rich gas in the reformer and the fuel cell is substantially replaced with the raw material supplied into the reformer, the control means performs such control that air from the first air supply means is supplied to the reformer and the to the fuel cell, and wherein the predetermined temperature is a temperature at which the hydrogen rich gas is not generated or the hydrogen rich gas is generated in such an amount as not to react with air.

The fuel cell power generation system comprising:
a reformer which generates a hydrogen rich gas from a raw material by reforming reaction;

raw material supply means of supplying the raw material to the reformer;

temperature control means of controlling the temperature of the reformer so as to promote the reforming reaction;

first air supply means of supplying air to the reformer;

temperature detection means of detecting the temperature of the reformer;

a fuel cell in which electric power is generated by using the hydrogen rich gas; and control means of controlling the operations of the reformer, the raw material supply means, the first air supply means, the temperature control means and the fuel cell on the basis of the temperature detected by the temperature detection means, wherein the control means performs such control that the temperature of the reformer is equal to or lower than a predetermined temperature before the operation of the fuel cell is started, and performs such control as to increase the temperature of the reformer above the predetermined temperature and to start the operation of the fuel cell when replacement in the reformer and the fuel cell with the raw material supplied into the reformer is completed, and wherein the predetermined temperature is a temperature at which the hydrogen rich gas is not generated or the hydrogen rich gas is generated in such an amount as not to react with air.

The fuel cell power generation system, wherein the temperature control means includes a burner and second air supply means of supplying air for combustion to the burner, and wherein the control means sets the rate of supply of air to the burner of the second air supply means to an excessively high value to achieve the control for maintaining the temperature equal to or lower than the predetermined temperature.

The fuel cell power generation system, wherein the burner combusts exhaust gas from the fuel cell or the reformer.

The fuel cell power generation system, further comprising a second burner which combusts exhaust gas from the fuel cell or the reformer.

The fuel cell power generating system, wherein the temperature control means includes water vapor supply means of supplying water vapor to the reformer, wherein the reformer conducts the reforming reaction by water vapor reforming, and wherein the control means sets the rate of supply of water vapor to the reformer of the water vapor supply means to an excessively high value to achieve the control for maintaining the temperature of the reformer equal to or lower than the predetermined temperature.

The fuel cell power generation system, further comprising:

a carbon monoxide remover which is provided between the reformer and the fuel cell, and which removes carbon monoxide contained in the hydrogen rich gas generated by the reformer; and channel shutoff means of shutting off the channel between the carbon monoxide remover and the fuel cell, wherein when the operation of the fuel cell is started, the control means performs such control that the hydrogen rich gas output from the carbon monoxide remover is not introduced into the fuel cell before the carbon monoxide remover becomes able to effectively remove carbon monoxide contained in the hydrogen rich gas after the temperature of the reformer has been increased above the predetermined temperature.

The fuel cell power generation system, wherein the control means performs such control that the raw material is supplied into the fuel cell before the system starts operating, and performs such control that the channel shutoff means shuts off the channel after the raw material has been enclosed in the fuel cell.

The fuel cell power generation system, wherein the raw material supply means and the first air supply means have a common supply channel connected to the reformer, and wherein the supply channel is switched so that the raw material is supplied to the reformer when the supply channel is used as a portion of the raw material supply means, and the supply channel is switched so that the air is supplied to the reformer when the supply channel is used as a portion of the first air supply means.

The fuel cell power generation system, further comprising desulfurizing means provided between the raw material supply means and the reformer.

A method of controlling a fuel cell power generation system comprising a reformer which generates a hydrogen rich gas from a raw material by reforming reaction, raw material supply means of supplying the raw material to the reformer, temperature control means of controlling the temperature of the reformer so as to promote the reforming reaction, first air supply means of supplying air to the reformer, temperature detection means of detecting the temperature of the reformer, and a fuel cell in which electric power is generated by using the hydrogen rich gas, said method comprising a control process of controlling the operations of the reformer, the raw material supply means, the first air supply means, the temperature control means and the fuel cell on the basis of the temperature detected by the temperature detection means, wherein in the control process, when the operation of the fuel cell is stopped, control is performed so that the temperature of the reformer is equal to or lower than a predetermined temperature, while at least the raw material supply means is continuing supply of the raw material; and when the temperature of the reformer becomes equal to the predetermined temperature, and when the hydrogen rich gas in the reformer and the fuel cell is substantially replaced with the raw material supplied into the reformer, control is performed so that air from the first air supply means is supplied to the reformer and the to the fuel cell, and wherein the predetermined temperature is a temperature at which the hydrogen rich gas is not generated or the hydrogen rich gas is generated in such an amount as not to react with air.

A method of controlling a fuel cell power generation system comprising a reformer which generates a hydrogen rich gas from a raw material by reforming reaction, raw material supply means of supplying the raw material to the reformer, temperature control means of controlling the temperature of the reformer so as to promote the reforming reaction, first air supply means of supplying air to the reformer, temperature detection means of detecting the temperature of the reformer, and a fuel cell in which electric power is generated by using the hydrogen rich gas, said method comprising a control process of controlling the operations of the reformer, the raw material supply means, the first air supply means, the temperature control means and the fuel cell on the basis of the temperature detected by the temperature detection means, wherein in the control process, control is performed so that the temperature of the reformer is equal to or lower than a predetermined temperature before the operation of the fuel cell is started; and control is performed as to increase the temperature of the reformer above the predetermined temperature and to start the operation of the fuel cell when replacement in the reformer and the fuel cell with the raw material supplied into the reformer is completed, and wherein the predetermined temperature is a temperature at which the hydrogen rich gas is not generated or the hydrogen rich gas is generated in such an amount as not to react with air.

The method of controlling a fuel cell power generation system, wherein the temperature control means of the fuel cell power generation system includes a burner and second air supply means of supplying air for combustion to the burner, and wherein in the control process, the rate of supply of air to the burner of the second air supply means is set excessively high to achieve the control for maintaining the temperature of the reformer equal to or lower than the predetermined temperature.

The method of controlling a fuel cell power generation system, wherein the fuel cell power generation system further has water vapor supply means of supplying water vapor to the reformer, and the reformer conducts the reforming reaction by water vapor reforming, and wherein in the control process, the rate of supply of water vapor to the reformer of the water vapor supply means is set excessively high to achieve the control for maintaining the temperature of the reformer equal to or lower than the predetermined temperature.

DESCRIPTION OF SYMBOLS

Figure 1:
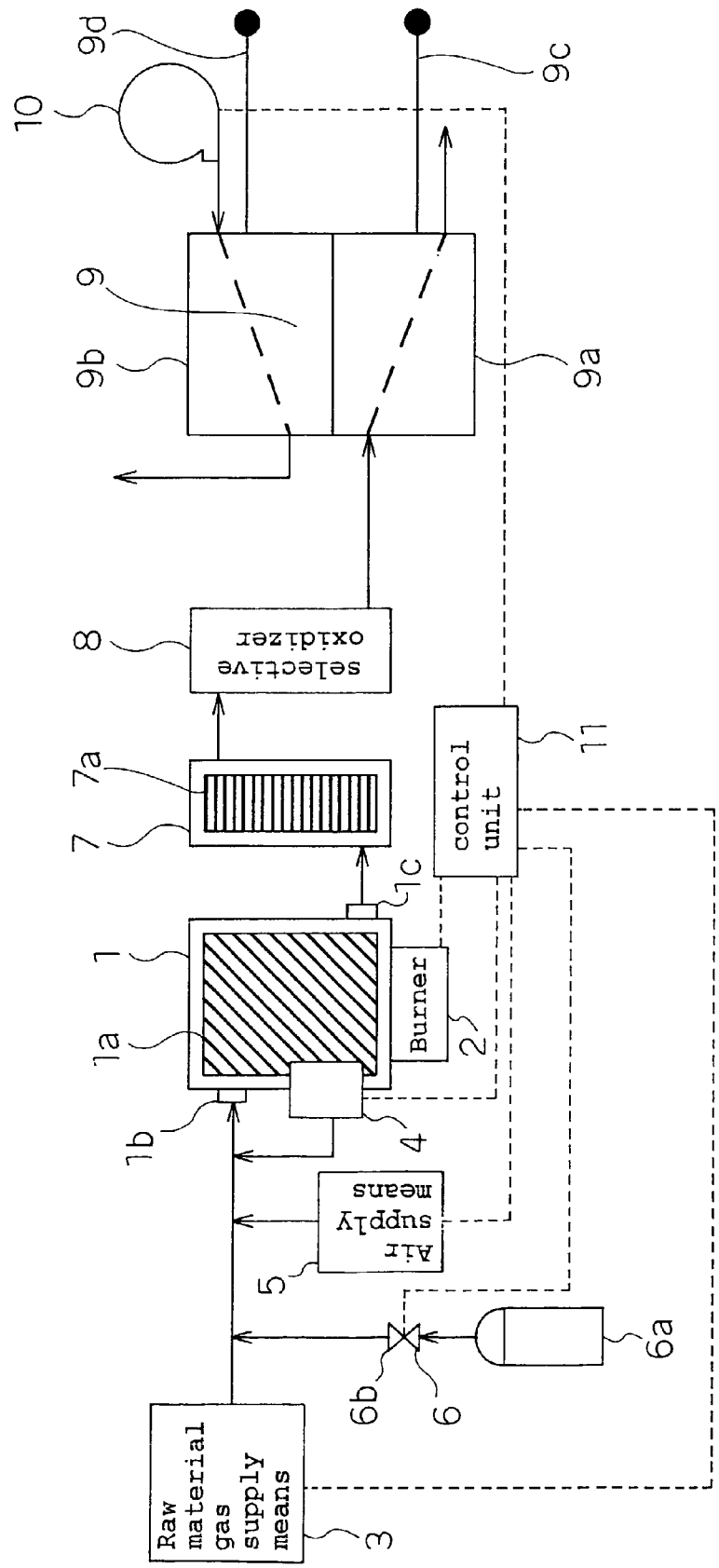
FIG. 1 is a diagram showing the configuration of a fuel cell power generation system in Embodiment 1 of the present invention.

1 Reformer
2 Burner
3 Raw material gas supply means
4 Water vapor generator
5 Air supply means
6 Inert gas supply means
7 Shifter
9 Fuel cell
9a Fuel electrode
9b Oxygen electrode
21 Bypass line
22 Switching means
23 Raw material gas bypass line
25 Resistor
32 Discharged line
51 Reformer
52 Burner
53 Burner blower
54 Raw material gas supply means
54a Raw material gas line
55 Air supply means
55a Air suction line
56 Fuel cell
58 Discharged line
61 Three-way valve
62 Second burner
510 Water vapor generator
511 Temperature detector
512 Control means
521 Gas supply means
521a Inlet
522 Switching device
531 Carbon monoxide remover
522 Bypass line
533 Switching means
541 Stop valve
542 Desulfurizer

PREFERRED EMBODIMENTS OF THE INVENTION

Embodiments of the present invention will be described with reference to the accompanying drawings.

(Embodiment 1)

FIG. 1 is a diagram showing the configuration of a fuel cell power generation system in Embodiment 1 of the present invention. The fuel cell power generation system has a reformer 1 in which a reforming catalyst 1a for causing reforming reaction is packed. The reformer 1 is provided with a burner 2 as a heating means. A raw material gas supply means 3 is connected to an upstream inlet 1b of the reformer 1, to which a water vapor generator 4, an air supply means 5 and an inert gas supply means 6 (e.g., a high-pressure nitrogen bomb 6a filled with nitrogen gas typifying a particular inert gas in accordance with the present invention, and an electrically operated nitrogen valve 6b) are also connected in a confluent manner.

A shifter 7 for removing carbon monoxide is connected to a downstream port 1c of the reformer 1. A shifting catalyst 7a for shift reaction of carbon monoxide is packed in the shifter 7. A selective oxidizer 8 for reducing the concentration of carbon monoxide may be further provided on the downstream side of the shifter 7. A fuel cell 9 is connected to a downstream port of the shifter 7. The fuel cell 9 is constituted by a fuel electrode 9a and an oxygen electrode 9b. Electric output lines 9c and 9d are respectively connected to the fuel electrode 9a and oxygen electrode 9b. A blower 10 is connected to the oxygen electrode 9b of the fuel cell 9. A control unit 11 is provided to control the operation of the system.

The operation in Embodiment 1 will now be described. When power generation is performed, the raw material gas supply means 3 supplies a raw material gas such as hydrocarbon to the reformer 1 through the upstream port 1b of the same. When the raw material gas passes through the reforming catalyst 1a, it is heated by the burner 2 and is converted into a hydrogen rich gas by reforming reaction. Carbon monoxide is ordinarily contained in this hydrogen rich gas. If this hydrogen rich gas containing carbon monoxide is supplied to the fuel cell 9, the catalyst in the fuel electrode 9a is poisoned with carbon monoxide, resulting in a reduction in generating ability. Therefore this hydrogen rich gas is fed to the shifter 7 to undergo carbon monoxide removal reaction in the presence of the shifting catalyst 7a in the shifter 7, and is thereafter supplied to the fuel electrode 9a of the fuel cell 9. In particular, in the case of a solid polymer fuel cell, the influence of carbon monoxide poisoning is markedly large because the reaction temperature in this type of fuel cell is lower. In such a case, the selective oxidizer 8 for further reducing the concentration of carbon monoxide may be provided on the downstream side of the reformer 1.

On the other hand, air used as an oxidizer gas is supplied from the blower 10 to the oxygen electrode 9b of the fuel cell 9. In the fuel cell 9, hydrogen supplied to the fuel electrode 9a and oxygen in air supplied to the oxygen electrode 9b are caused to react with each other, thereby generating power.

Electric power supply is performed through the electric output lines 9c and 9d. Liquid fuel hydrocarbon may be used instead of the raw material gas.

The operation at a shut down will next be described. First, supply of raw material gas from the raw material gas supply means 3 to the reformer 1 is stopped. In the case an emergency stop, then hydrogen rich gas staying in the reformer 1, the shifter 7, and the fuel electrode 9a of the fuel cell 9 is discharged by using inert gas supplied from the inert gas supply means 6. In the case of an ordinary stop, hydrogen rich gas staying in the reformer 1, the shifter 7, and the fuel electrode 9a of the fuel cell 9 is discharged by a means without using inert gas.

In Embodiment 1, the means which operates at the time of an ordinary stop without using inert gas, and which corresponds to the alternative gas supply means of the present invention, causes water vapor supplied from the water vapor generator 4 after a stop of supply of raw material gas to the reformer 1 to flow and also causes purging air supplied from the air supply means 5 to flow in this order, thereby discharging hydrogen rich gas staying in the reformer 1, the shifter 7, and the fuel electrode 9a of the fuel cell 9. The reason for avoiding discharge using air immediately after a stop of supply of raw material gas is because it is possible that a hydrogen-oxygen mixture gas having such a concentration that hydrogen and oxygen react with each other may be formed at the interface between hydrogen rich gas and air to have vigorous oxidation reaction in a high-temperature atmosphere in the reformer 1 when passing through the same. Also, the reason for again performing discharge using air after discharging hydrogen rich gas by using water vapor is because there is a need to avoid the adverse effect of water vapor when water vapor stays or changes into droplets by being cooled, i.e. the action of water to cause corrosion in the channel.

In Embodiment 1, in a situation where there is an abnormality, e.g., failure to supply water vapor from the water vapor generator 4 or failure to supply purging air from the air supply means 5 due to a system fault, and where it is therefore difficult to discharge residual hydrogen rich gas by the means of discharging at the time of an ordinary stop without using inert gas, the high-pressure nitrogen cylinder 6a and the normally open type of electrically operated nitrogen valve 6b (having a function to open when power is not supplied), which are an example of the inert gas supply means 6, are used as emergency stop means to mechanically supply inert gas (nitrogen) without electric power. That is, at the time of an emergency stop, supply of power to the system is stopped and supply of raw material gas from the raw material gas supply means 3 to the reformer list hereby stopped. Simultaneously, the normally open type electrically operated nitrogen valve 6b opens to supply nitrogen provided as inert gas in the high-pressure nitrogen cylinder 6a, thereby discharging hydrogen rich gas staying in the reformer 1, the shifter 7, and the fuel electrode 9a of the fuel cell 9.

An abnormality detection means of detecting the above-described abnormality may be further provided. The control means 11 may perform such control that when this abnormality detection means detects an abnormality, the control means 11 stops supply of power to the system or the operated nitrogen value 6b to enable the inert gas supply means 6 to operate automatically. Alternatively, only an operation for notifying a user of the result of detection of an abnormality may be performed by using an external indication means such as buzzer or a lamp to urge the user to change the mode of operation to enable the inert gas supply means 6 to operate. Detection of an abnormality may be such that the rate at which water vapor is generated by the water vapor generator 4 and the rate at which purging air is supplied from the air supply means 5 are monitored and an abnormal value of these rates exceeding one of limits set in advance is detected.

Since inert gas is not used at the time of an ordinary stop as described above, the construction or components of the inert gas supply means 6 can be minimized in size, number, etc., for example, by reducing the size of the high-pressure nitrogen cylinder 6a or reducing the number of cylinder to reduce the installation space while ensuring the least necessary performance, thereby reducing the installation space and, hence, the initial cost and the running cost. The system is thus arranged to prevent hydrogen rich gas from staying in the channel and vigorously reacting with oxygen even at the time of an emergency stop, thereby ensuring safety.

(Embodiment 2)

Figure 2:
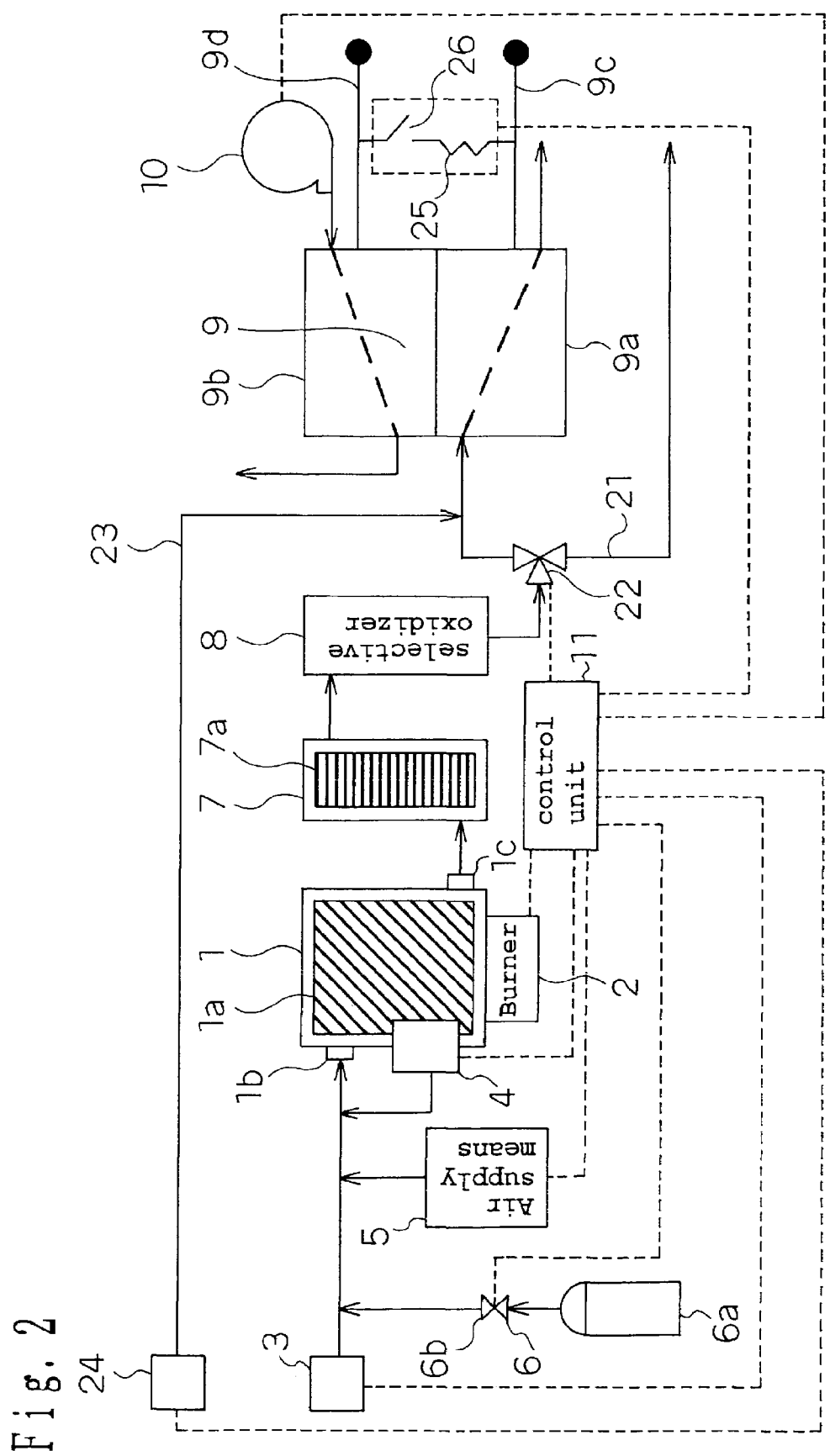
FIG. 2 is a diagram showing the configuration of a fuel cell power generation system in Embodiment 2 of the present invention.

FIG. 2 is a diagram showing the configuration of a fuel cell power generation system in Embodiment 2 of the present invention. The same components as those in Embodiment 1 are indicated by the same reference characters and the description for them will not be repeated. A bypass line 21 branches off the main line through a switching means 22 provided between the shifter 7 and the fuel electrode 9a of the fuel cell 9. A raw material gas bypass line 23 forming a portion of the fuel cell raw material gas supply means of the present invention is connected to a second raw material gas supply means 24. The raw material gas bypass line 23 has a confluence point between the switching means 22 and the fuel electrode 9a of the fuel cell 9. A resistor 25 and a switch 26 are connected between the electric output lines 9c and 9d.

The operation at a shutdown in Embodiment 2 will next be described. The same emergency stop method as that in Embodiment 1 is used. The means not using inert gas at the time of a normal stop is as described below. First, supply of raw material gas to the reformer 1 is stopped, and the switching means 22 switches the hydrogen rich gas line to the by pass line 21. Water vapor supplied from the water vapor generator 4 and purging air supplied from the air supply means 5 are then caused to flow through the reformer 1-shifter 7-line into the bypass line 21 successively in this order, thereby discharging residual hydrogen rich gas.

Further, residual hydrogen rich gas in the fuel electrode of the fuel cell 9 is discharged by one or both of two methods described below.

In the first method, when supply of raw material gas to the reformer 1 is stopped, and when the switching means 22 switches the hydrogen rich gas line to the by pass line 21, raw material gas is supplied from the second raw material gas supply means 24 forming a portion of the fuel cell raw material gas supply means of the present invention to the fuel electrode 9a of the fuel cell 9 through the raw material gas bypass line 23, thereby discharging hydrogen rich gas. The second raw material gas supply means 24 may be removed and raw material gas may be supplied to the raw material gas bypass line 23 from the raw material gas supply means 3. In this case, the fuel cell raw material gas supply means of the present invention is constituted by the raw material gas supply means 3 and the raw material gas by pass line 23.

In the second method, when supply of raw material gas to the reformer 1 is stopped, and when the switching means 22 switches the hydrogen rich gas line to the by pass line 21, the switch 26 is closed to electrically connect the fuel electrode 9a and the oxygen electrode 9b of the fuel cell 9 via the electric output lines 9c and 9d and the resistor 25 to cause residual hydrogen to react with oxidizer gas, thereby consuming residual hydrogen. If the system is arranged to use only the second method, the second raw material gas supply means 24 and the fuel gas bypass line 23 may be removed.

In Embodiment 2, residual hydrogen in the fuel cell 9 is discharged by a means other than purging using water vapor for a reason described below. In the case of purging using water vapor, even if it is followed by purging using air, it is not possible to ensure that the flow rate on the fuel electrode side 9a is set sufficiently high when the operation is restarted, because water vapor generally tends to condense and clog narrow flow paths in the fuel electrode 9a of the fuel cell 9, resulting in failure to generate power with stability. In this embodiment, since purging using water vapor is not performed, the above-described problem can be avoided.

(Embodiment 3)

Figure 3:
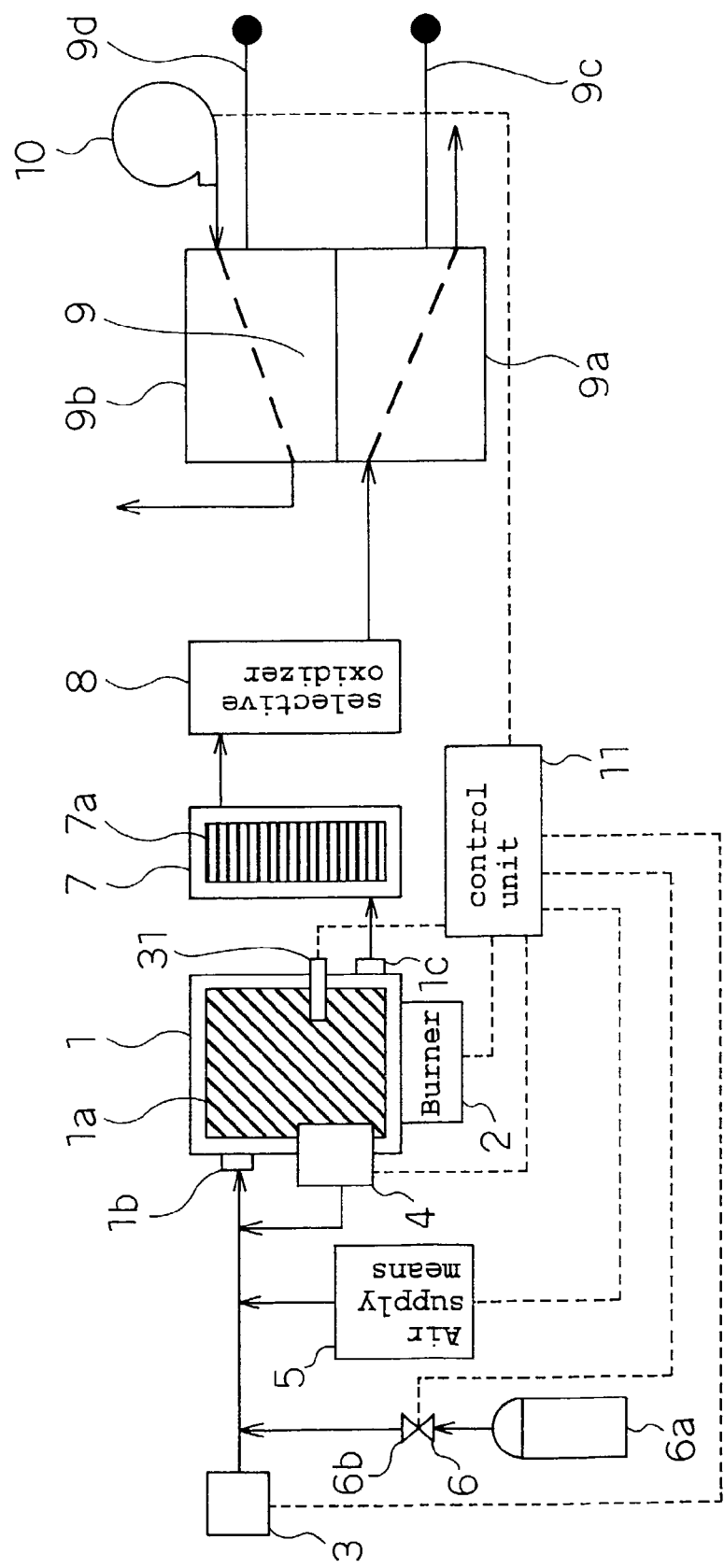
FIG. 3 is a diagram showing the configuration of a fuel cell power generation system in Embodiment 3 of the present invention.

FIG. 3 is a diagram showing the configuration of a fuel cell power generation system in Embodiment 3 of the present invention. The same components as those in Embodiment 1 are indicated by the same reference characters and the description for them will not be repeated. A temperature detector 31 is attached to the reformer 1 to detect the temperature of the reforming catalyst 1a. Ordinarily, reforming reaction for producing a hydrogen rich gas from a raw material gas such as hydrocarbon is conducted at a certain value of temperature or above (in the case of water vapor reforming system, usually at 600 to 700° C.). In this embodiment, the amount of heating by the burner 2 and the raw material gas flow rate are controlled on the basis of the temperature of the reforming catalyst 1a detected by the temperature detector 31 to adjust the temperature of the reforming catalyst 1a so that correct reforming reaction is achieved.

The operation in Embodiment 3 at the time of startup before generation of power will be described. When the operation is started, raw material gas such as hydrocarbon is supplied from the raw material gas supply means 3 to the reformer 1 through the upstream port 1b of the same. At an initial stage of the operation, reforming reaction does not proceed effectively since the temperature of the reforming catalyst 1a is low. Hydrogen rich gas is produced when the temperature of the reforming catalyst 1a is increased by heating with the burner 2 to a point high enough to promote the reforming reaction.

When hydrogen rich gas is produced, hydrogen first supplied to the fuel electrode 9a of the fuel cell 9 and oxygen in air supplied to the oxygen electrode 9b react with each other to generate electric power, which is supplied through the electric output lines 9c and 9d.

In Embodiment 3, in a situation where a need arises to stop the operation of the system after startup of the system and before the fuel cell 9 starts generating power, the same means not using inert gas as the method in Embodiment 1 is used when the temperature of the reforming catalyst 1a detected by the temperature detector 31 on the reformer 1 is equal to or higher than the predetermined temperature high enough to produce hydrogen rich gas.

On the other hand, when the temperature of the reforming catalyst 1a detected by the temperature detector 31 on the reformer 1 is lower than the predetermined temperature before hydrogen rich gas is produced, the means not using inert gas is used as described below. Supply of raw material gas to the reformer 1 is first stopped and the air supply means 5 causes purging air to flow to discharge residual gas staying in the reformer 1, the shifter 7, and the fuel electrode 9a of the fuel cell 9.

In Embodiment 3, when the temperature of the reforming catalyst 1a is lower than the predetermined temperature before hydrogen rich gas is produced, purging using water vapor is not performed and only purging using air is performed. In this case, contact of air for purging with high-temperature hydrogen rich gas is prevented, thereby ensuring safety.

(Embodiment 4)

Figure 4:
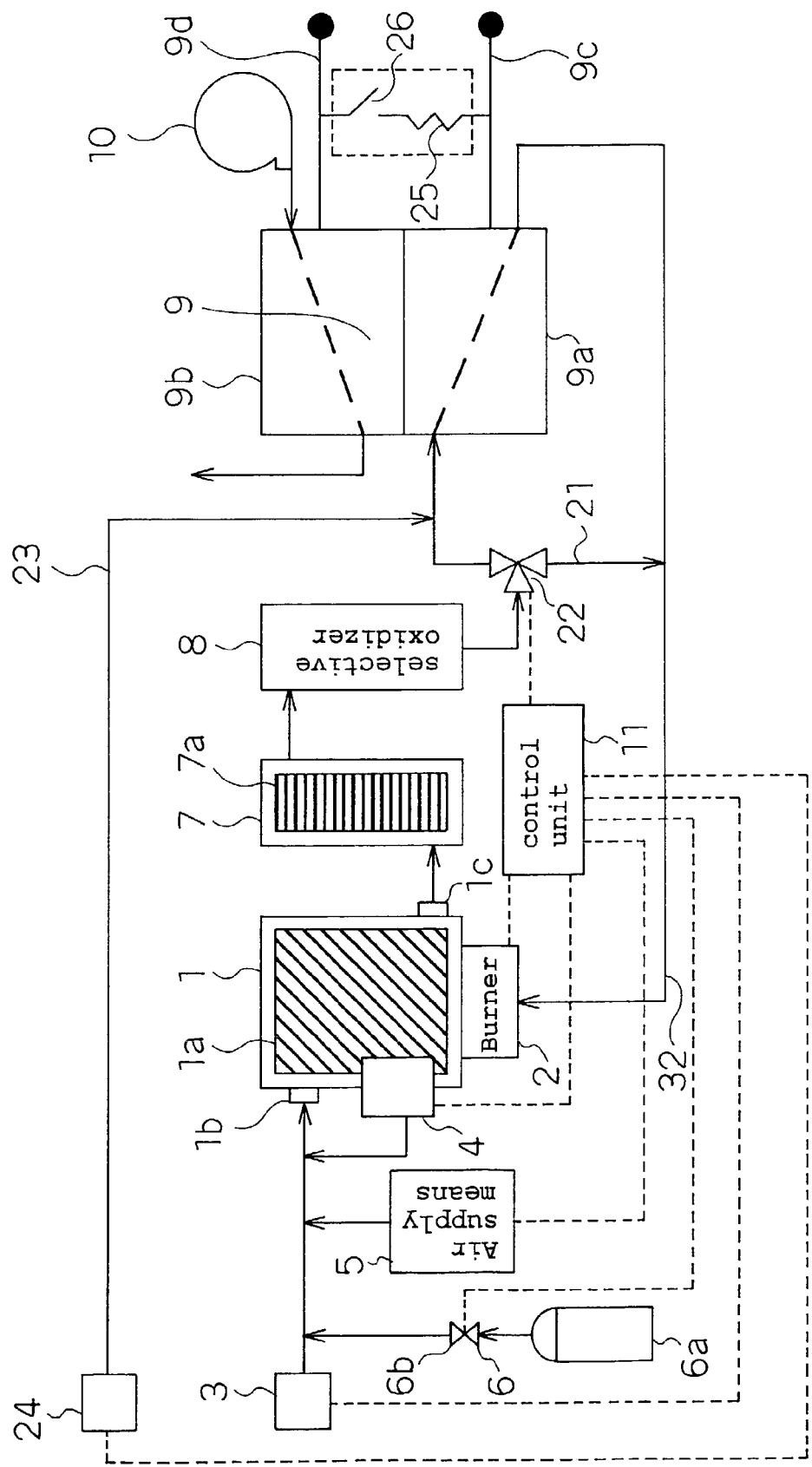
FIG. 4 is a diagram showing the configuration of a fuel cell power generation system in Embodiment 4 of the present invention.

FIG. 4 is a diagram showing the configuration of a fuel cell power generation system in Embodiment 4 of the present invention. The same components as those in Embodiments 1 and 2 are indicated by the same reference characters and the description for them will not be repeated. A discharged line 32 is connected between the fuel electrode 9a of the fuel cell 9 and the burner 2 for heating the reformer 1. Most of the hydrogen component in hydrogen rich gas supplied to the fuel electrode 9a of the fuel cell 9 is used for power generation reaction, but a slight amount of hydrogen in the gas is discharged as hydrogen off-gas to be effectively used as a heating fuel in the burner 2. The bypass line 21 also has a confluent connection to this discharged line 32.

In this embodiment, hydrogen rich gas or burnable gas discharged through the discharged line 32 or by pass line 21 is not discharged out of the system but completely burnt in the burner 2, thereby ensuring a higher level of safety.

(Embodiment 5)

Embodiment 5 of the present invention comprises any one of the fuel cell power generation systems in Embodiments 1 to 4 shown in FIGS. 1 to 4, and is characterized in that shifting catalyst 7a packed or included in the shifter 7 for removing carbon monoxide provided between the reformer 1 and the fuel cell 9 contains at least one of precious metal catalysts: platinum, ruthenium, rhodium, and palladium.

In most instances, a base metal catalyst such as a copper-zinc catalyst is used for shifting reaction for removing carbon monoxide. However, using a copper-zinc catalyst as shifting catalyst 7a entails a drawback in that if purging air is caused to flow through the shifter 7 immediately after shutdown as in Embodiments 1 to 4, shifting catalyst 7a deteriorates by oxidation. In Embodiment 5, a precious metal catalyst selected from platinum, ruthenium, rhodium, and palladium is used as shifting catalyst 7a. Therefore shifting catalyst 7a does not deteriorate by oxidation even if purging air is caused to flow through the shifter 7 immediately after shutdown, thus largely improving durability.

(Embodiment 6)

Embodiment 6 of the present invention comprises any one of the fuel cell power generation systems in Embodiments 1 to 4 shown in FIGS. 1 to 4, and is characterized in that when the control unit 11 recognizes an emergency stop, it communicates information about the emergency stop to a maintenance manager or a maintenance company. Communication for this information is performed by a communication apparatus controlled by the control means 11. For example, the communication apparatus is realized as a telephone, an internet terminal, or a wireless communicator.

"Emergency stop" in Embodiments 1 to 4 occurs at a frequency of once in the life of one product or lower. At an emergency stop, however, the normally-open electrically operated nitrogen valve 6b opens to continue supplying nitrogen from the high-pressure nitrogen cylinder 6a. Therefore, when the operation is restarted, maintenance operations are required including resetting the abnormal condition, e.g., malfunctioning, and replacing the high-pressure nitrogen cylinder. In Embodiment 6, information about occurrence of an emergency stop is immediately communicated to a maintenance manager or a maintenance company to enable it to soon take necessary maintenance steps to avoid inconvenience to the user.

While use of water vapor and air as alternative gases of the present invention has been described, alternative gases in accordance with the present invention may be selected from any kinds of gas other than the particular inert gas used by the inert gas supply means. For example, a raw material gas may be used.

An arrangement for performing replacement in the reformer and the fuel cell by a raw material gas in a system in accordance with the present invention will next be described as another example of the alternative gas supply means of the present invention. However, for ease of description, the configuration of fuel cell power generation system which has no mechanism for replacement with inert gas and in which replacement is performed only with a raw material will be described.

(Embodiment 7)

Figure 5:
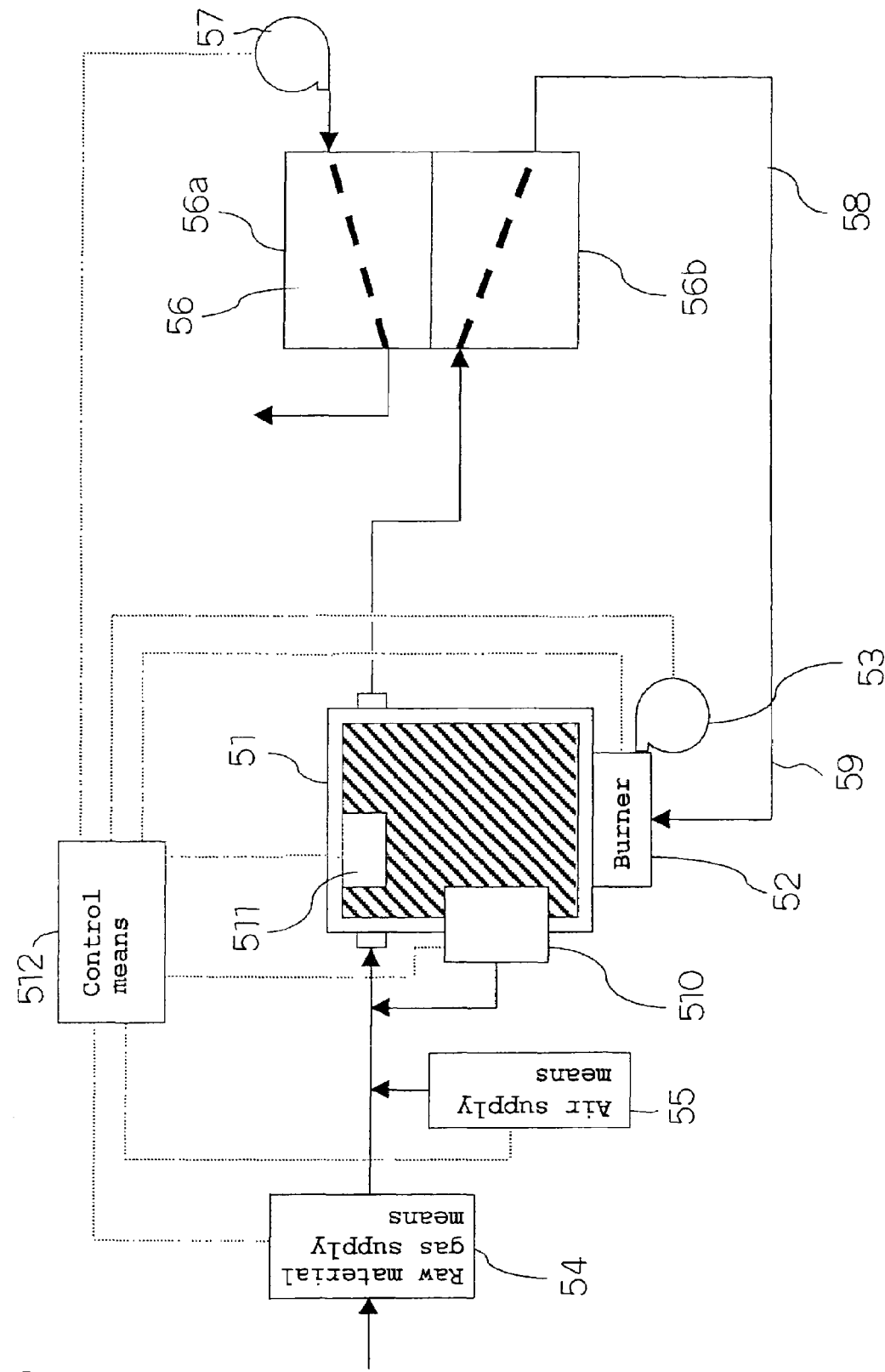
FIG. 5 is a diagram showing the configuration of a fuel cell power generation system in Embodiment 7 of the present invention.

FIG. 5 is a diagram showing the configuration of a fuel cell power generation system in Embodiment 7 of the present invention. As illustrated, a reformer 51 is provided with a burner 52 and a burner blower 53 for supplying air for combustion to the burner 52, which are means of enabling a hydrogen rich gas to be produced from a raw material gas by reforming reaction with this gas. A raw material gas supply means 54 and an air supply means 55 are provided on the upstream side of the reformer 51. A fuel cell 56 is provided on the downstream side of the reformer 51. The fuel cell 56 is constituted by a fuel electrode 56*a* and an oxygen electrode 56*b*. Hydrogen rich gas produced in the reformer 51 is supplied to the fuel electrode 56*a*, while air used as an oxidizer gas is supplied to the oxygen electrode 56*b* by a blower means 57. This hydrogen rich gas and air are caused to react with each other to generate electric power. A discharged line 58 is connected to the downstream end of the fuel electrode 56*a* and to a fuel supply line 59 of the burner 52.

For reforming reaction in this embodiment, a water vapor reforming system is used, for example. A water vapor generator 510 is connected to the reformer 51. A temperature detector 511 is provided as a means of detecting the temperature in the reformer 51. A control means 512 controls the operations of the reformer 51, the burner 52, the burner blower 53, the raw material gas supply means 54, the blower means 57, and the water vapor generator 510 on the basis of the temperature detected with the temperature detector 511.

A carbon monoxide remover may be provided between the reformer 51 and the fuel electrode 56*a* of the fuel cell 56.

The operation in Embodiment 7 will now be described. When power generation is performed, the raw material gas supply means 54 supplies a raw material gas such as hydrocarbon to the reformer 51 under the control of the control means 512. The reformer 51 produces hydrogen rich gas by reforming reaction caused by heating with the burner 52, and supplies the produced gas to the fuel electrode 56*a* of the fuel cell 56. On the other hand, air used as an oxidizer gas is supplied by the blower means 57 to the oxygen electrode 56*b* of the fuel cell 56. In the fuel cell 56, hydrogen rich gas supplied to the fuel electrode 56*a* and oxygen in air supplied to the oxygen electrode 56*b* are caused to react with each other, thereby generating electric power. While most of hydrogen is used for power generation reaction at the fuel electrode 56*a* of the fuel cell 56, hydrogen off-gas not used for the reaction is supplied through the discharge line 58 and then fuel supply line 59 to the burner 52 to be used as a fuel for heating the reformer 51. Alcohol, LPG, or a liquid fuel hydrocarbon compound may be used instead of raw material gas. That is, the raw material is not limited to gaseous form and may be provided in liquid form. The same also applies to each of embodiments described below.

The operation at shutdown of the fuel cell 56 will next be described. First, under the control of the control means 512, while supply of raw material gas from the raw material gas supply means 54 is being continued, the temperature of the reformer 51 is reduced to a point equal to or lower than a predetermined temperature at which, hydrogen rich gas is not generated by reforming reaction or an amount of hydrogen rich gas of a certain concentration such that the gas does not react with air when exposed to air is generated. The reformer 51 is maintained at this temperature. At this time, it is desirable to continue supply of water vapor from the water vapor generator 510 in order to prevent part of raw material gas which has not reacted from carbonizing to remain as a carbide. However, if raw material gas does not carbonize, supply of water vapor may be stopped.

This predetermined temperature, depending on the construction of the reformer 51, may be set to about 300° C. to limit generation of hydrogen rich gas, thus ensuring an adequate level of safety. "An amount of hydrogen rich gas of a certain concentration such that the gas does not react with air when exposed to air" is expressed as the proportion of hydrogen rich gas generated in the entire gas in the reformer 51, i.e., (the amount of hydrogen rich gas/(the amount of supplied raw material gas+the amount of hydrogen rich gas)), which is about 0 to 4%.

At this time, raw material gas supplied from the raw material gas supply means 54 is not converted into hydrogen rich gas in the reformer 51, and this raw material gas, not changed, flows out of the reformer 51 to the fuel electrode 56*a* of the fuel cell 56, flows through the discharged line 58 and the fuel supply line 59, and flows into the burner 52 to discharge hydrogen rich. Thus, raw material gas replaces hydrogen rich gas in the lines. In the burner 52, hydrogen rich gas forced into the burner 52 by raw material gas is burnt and consumed. Subsequently, when raw material gas is discharged, it is burnt and consumed.

At a time after the start of supply of raw material gas when it can be determined that the entire hydrogen rich gas has been replaced with raw material gas in each component and each line or that the concentration of residual hydrogen rich gas has been reduced to such a level that the hydrogen rich gas does not react with air when exposed to air, supply of raw material gas is stopped. Subsequently, purging air supplied from the air supply means 55 is caused to flow through the reformer 51, the fuel electrode 56*a* of the fuel cell 56, the discharged line 58, the fuel supply line 59, and the burner 52 in this order, thereby causing the entire raw material gas staying in each component and each line to be burnt in the burner 52 and discharged. Thus, air replaces gas in each component and each line. The reason for avoiding immediately performing discharge using air is because it is possible that a hydrogen-oxygen mixture gas having such a concentration that hydrogen and oxygen react with each other may be formed at the interface between hydrogen rich gas and air to have vigorous oxidation reaction in a high-temperature atmosphere in the reformer 51 when passing through the same.

Finally, when it is confirmed that the entire raw material gas has been replaced with air, the operations of the burner 52 and the burner blower 53 are stopped to stop the operation of the entire system.

The time at which it can be determined that hydrogen rich gas has been replaced with raw material gas substantially entirely may be a value determined by computation from the rates or speeds of flows of hydrogen rich gas and raw material gas in the lines, etc., measured in advance, or a time at which the concentration of hydrogen rich gas in the lines measured by using a concentration meter or the like becomes equal to or smaller than a predetermined value.

The following is a first method of reducing the temperature of the reformer 51 to the above-mentioned predetermined temperature. The air supply rate of the burner blower 53 for supplying combustion air to the burner 52 is set excessively high to reduce the temperature at which the reformer 51 is heated. The rate at which air is supplied is determined as shown below. The equivalent ratio $\lambda=A/F$ of the amount F of fuel (raw material gas, hydrogen rich gas and so on) when the burner 52 is burnt and the rate A of flow of supplied air is selected so that $\lambda=3$ or greater. The value of $\lambda$ when the burner 52 is completely combusting the fuel is $\lambda=1$.

A second method of reducing the temperature of the reformer 51 to the above-mentioned predetermined temperature is a method in which water is supplied at an excessive rate to the water vapor generator 510 for supplying water vapor to the reformer 51 in the water vapor reforming system to cool the reformer 51.

As another method of reducing the temperature of the reformer 51, a method of simply reducing the raw material gas flow rate to reduce the amount of heating by the burner 52 is conceivable. This method, however, also reduces the rate of flow of the material to be heated in the reformer 51. Therefore this method is not sufficiently effective in reducing the temperature of the reformer 51 under some conditions, and cannot be said to be advantageous.

Figure 11:
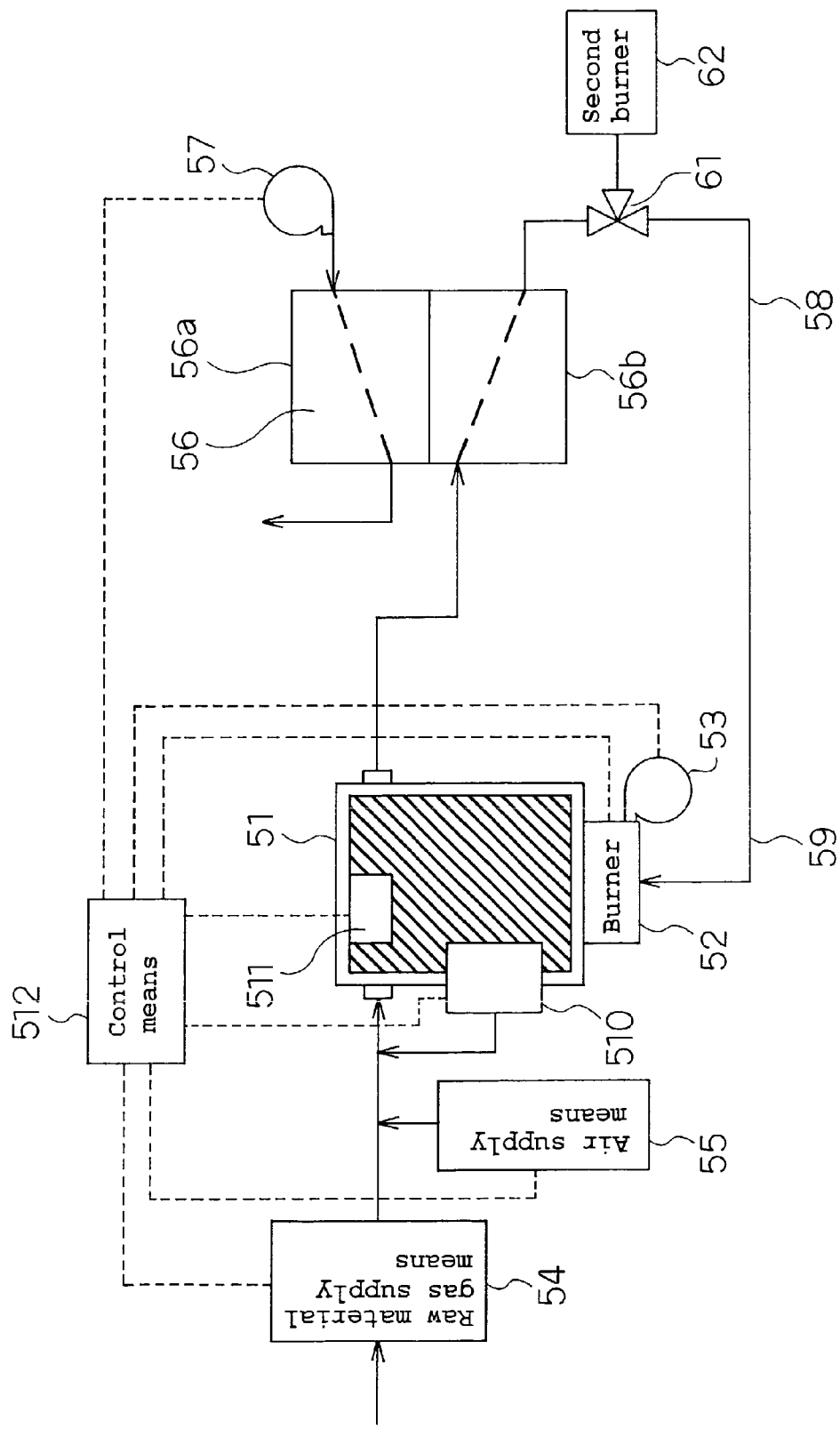
FIG. 11 is a diagram showing the configuration of another fuel cell power generation system in Embodiment 7 of the present invention.

In this embodiment, an arrangement shown in FIG. 11 may be adopted. In the arrangement shown in FIG. 11, a three way valve 61 is provided in the discharged line 58, and a second burner 62 is provided at the end of a branch from the three-way valve 61, thereby enabling hydrogen off-gas discharged from the fuel cell 56 to be burnt in the second burner 62. Therefore it is possible to immediately cool the reformer 51 to the predetermined temperature by stopping the burner 52. At this time, hydrogen off-gas may be released as a waste out of the system instead of being burnt in the second burner 62. The second burner 62 may be provided between the reformer 51 and the fuel cell 56.

Thus, in this embodiment, hydrogen rich gas is safely discharged by using raw material gas and air when the operation of the fuel cell 56 is stopped. The need for a nitrogen facility including a large nitrogen cylinder is eliminated to reduce the initial cost. Even in a case where the fuel cell power generation system is applied to an independent stationary home generator, an electric vehicle power supply or the like, the installation space is small. There is no need to periodically replace the nitrogen cylinder or replenish nitrogen, so that the running cost is reduced.

(Embodiment 8)

Figure 6:
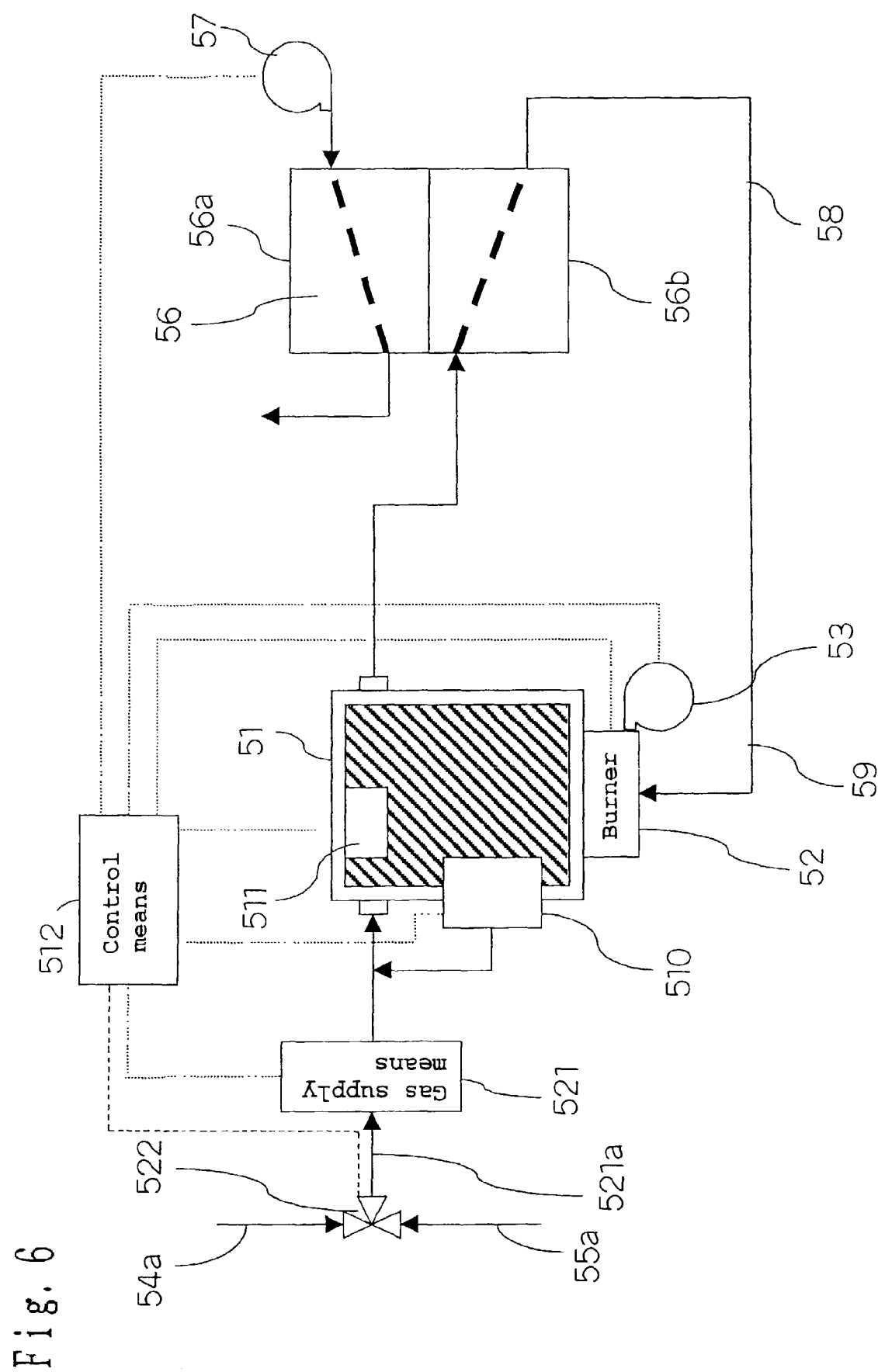
FIG. 6 is a diagram showing the configuration of a fuel cell power generation system in Embodiment 8 of the present invention.

FIG. 6 is a diagram showing the configuration of a fuel cell power generation system in Embodiment 8 of the present invention. The same components as those in Embodiment 7 are indicated by the same reference characters and the description for them will not be repeated. A gas supply means 521 functions both as raw material gas supply means 54 and air supply means 55. Under the control of the control means 512, a switching device 522 at an inlet 521*a* selects a raw material gas line 54*a* when the gas supply means 521 is used as raw material gas supply means 54, and selects an air suction line 55*a* when the gas supply means 521 is used as air supply means 55.

By using the gas supply means 521, the channel for raw material gas supply means 54 and the channel for air supply means 55 can be combined, so that the manufacturing cost of the fuel cell power generation system can be further reduced.

(Embodiment 9)

Figure 7:
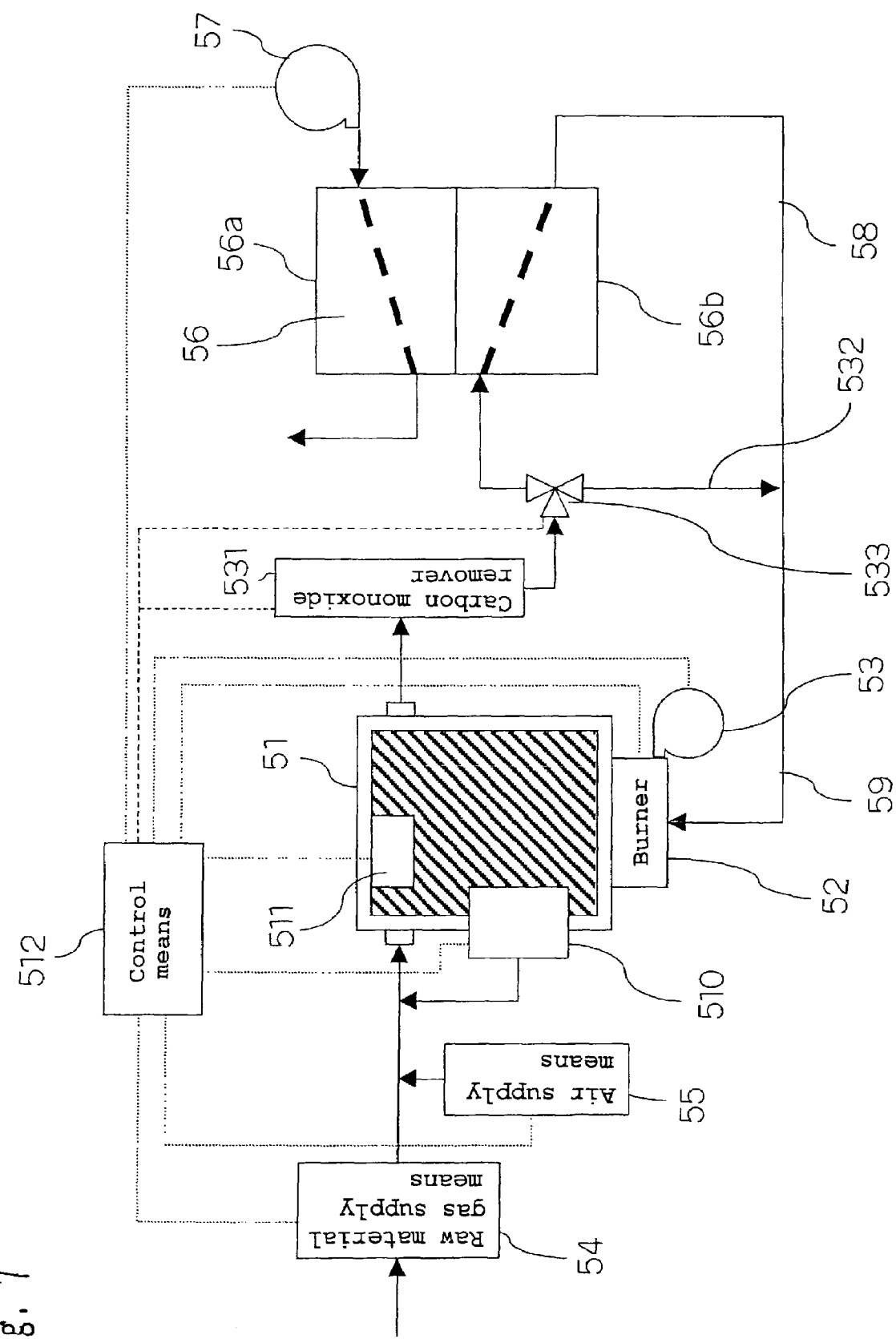
FIG. 7 is a diagram showing the configuration of a fuel cell power generation system in Embodiment 9 of the present invention.

FIG. 7 is a diagram showing the configuration of a fuel cell power generation system in Embodiment 9 of the present invention. The same components as those in Embodiment 7 are indicated by the same reference characters and the description for them will not be repeated. A carbon monoxide remover 531 is a means of removing carbon monoxide contained in hydrogen rich gas generated in the reformer 51. The carbon monoxide remover 531 is provided between the reformer 51 and the fuel electrode 56*a* of the fuel cell 56. The carbon monoxide remover 531 is ordinarily a means of selectively removing carbon monoxide in hydrogen rich gas by using shifting reaction or selective oxidation reaction. The carbon monoxide remover 531 plays a role in preventing the catalyst in the fuel electrode 56*a* of the fuel cell 56 from being poisoned with carbon monoxide. A bypass line 532 branches off through a switching means 533 provided between the carbon monoxide remover 531 and the fuel electrode 56*a* of the fuel cell 56, has a confluent point in the discharge line 58 from the fuel cell 56, and is connected to the fuel supply line 59 to the burner 52.

The operation in Embodiment 9 at a startup of the fuel cell 56 will be described. First, the raw material gas supply means 54 supplies raw material gas to the reformer 51, the carbon monoxide remover 531, the fuel electrode 56*a* of the fuel cell 56, the discharged line 58, the fuel supply line 59, and the burner 52 in this order to cause raw material gas to be burned in the burner 52 while the temperature of the reformer 51 is maintained at such a point for a predetermined period that hydrogen rich gas is not generated by reforming reaction. Thereafter, the switching means 533 switches from the line to the fuel electrode 56*a* of the fuel cell 56 to the bypass line 532, and the temperature of the reformer 51 is increased to a temperature at which hydrogen rich gas is generated by reforming reaction. Thereafter, when the carbon monoxide remover 531 becomes enable to effectively remove carbon monoxide contained in hydrogen rich gas, the switching means 533 switches from the bypass line 532 to the line to the fuel electrode 56*a* of the fuel cell 56, and power generation from the fuel cell 56 is started. Hydrogen rich gas from which carbon monoxide is not effectively removed is supplied to the burner 52 via the bypass line 532 to be used for combustion in the burner 52.

The reason why temporary switching to the bypass line 532 is performed even after reforming reaction has been caused by increasing the temperature of the reformer 51 after the completion of purging of residual air by causing raw material gas to flow to the fuel electrode 56*a* of the fuel cell 56 is as follows. If, even after the hydrogen rich gas generation temperature of the reformer 51 has been reached, the temperature in the carbon monoxide remover 531 on the downstream side of the reformer 51 is not sufficiently close to the reaction temperature, a substantially large amount of carbon monoxide is contained in the hydrogen rich gas output from the carbon monoxide remover 531. If such hydrogen rich gas is input to the fuel cell 56, the catalyst in the fuel electrode 56a is poisoned. Therefore, before the temperature in the carbon monoxide remover 531 becomes sufficiently close to the reaction temperature, hydrogen rich gas is fed into the bypass line 532 and is thereby prevented from being input to the fuel cell 56, thus preventing the catalyst in the fuel electrode 56a from being poisoned.

The above-described operation start procedure prevents hydrogen rich gas first supplied into the fuel electrode 56a of the fuel cell 56 from contacting air, thus enabling the operation to be started with safety.

As described above, the need for use of inert gas such as nitrogen even at a startup of the fuel cell 56 is eliminated to enable the installation space, the initial and running costs to be reduced.

(Embodiment 10)

Figure 8:
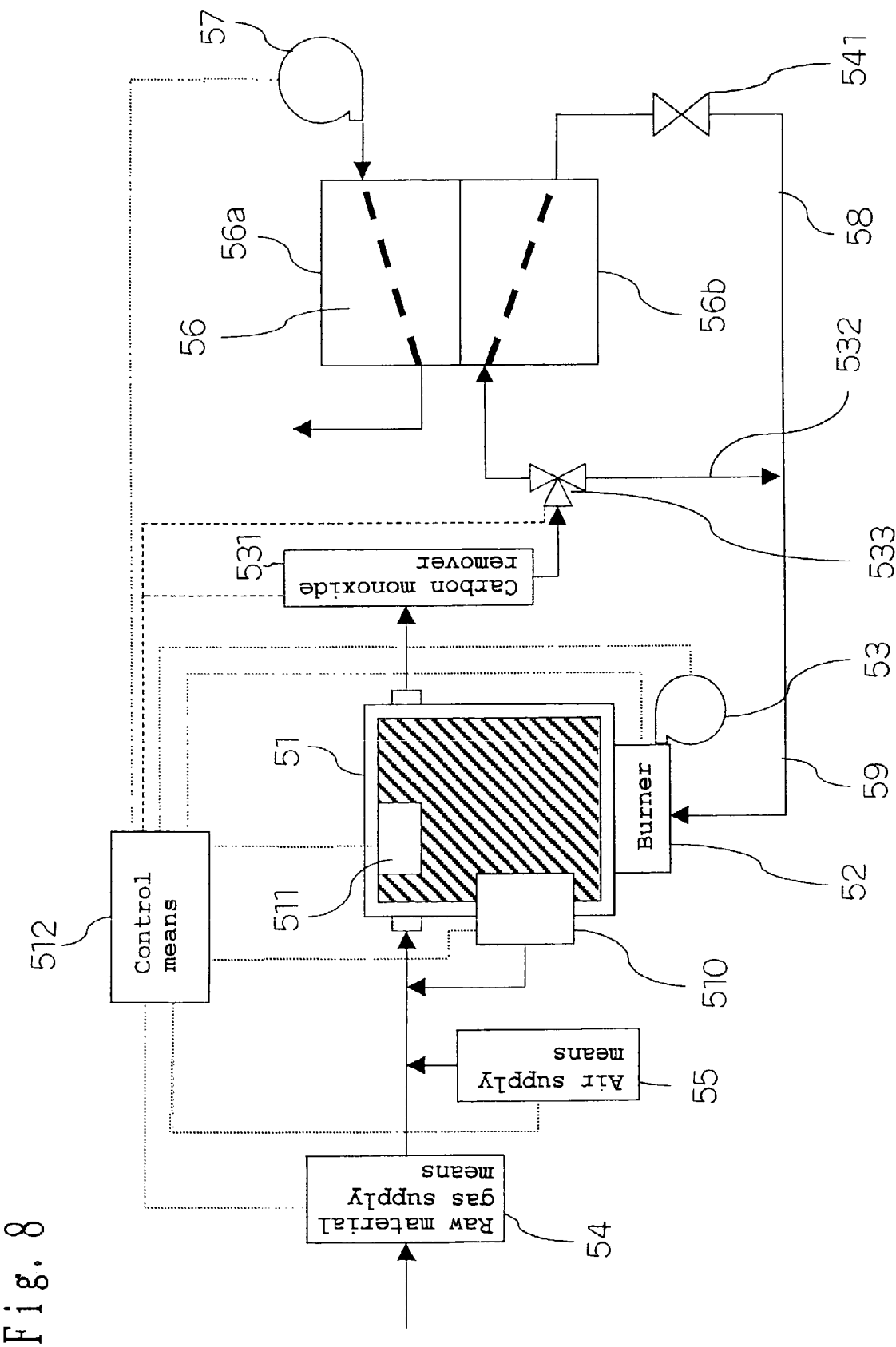
FIG. 8 is a diagram showing the configuration of a fuel cell power generation system in Embodiment 10 of the present invention.

FIG. 8 is a diagram showing the configuration of a fuel cell power generation system in Embodiment 10 of the present invention. The same components as those in Embodiments 7 and 9 are indicated by the same reference characters and the description for them will not be repeated. A stop valve 541 is provided in the discharged line 58 from the fuel cell 56.

The operation in Embodiment 10 will be described. First, before startup of the fuel cell 56, raw material gas is previously enclosed in the fuel electrode 56a of the fuel cell 56 between the switching means 533 and the stop valve 541. At a startup of the fuel cell 56, the raw material gas supply means 54 supplies raw material gas to the raw material gas reformer 51, the carbon monoxide remover 531, the bypass line 532, the fuel supply line 59, and the burner 52 in this order to increase the temperature of the reformer 51 to a point at which hydrogen rich gas is generated by reforming reaction. Thereafter, when the carbon monoxide remover 531 becomes enable to effectively remove carbon monoxide contained in hydrogen rich gas, the stop valve 41 is opened, the switching means 533 switches from the bypass line 532 to the line to the fuel electrode 56a of the fuel cell 56, and power generation from the fuel cell 56 is started.

The above-described operation start procedure prevents hydrogen rich gas first supplied into the fuel electrode 56a of the fuel cell 56 from contacting air, thus enabling the operation to be started with safety.

An example of a means of previously enclosing raw material gas in the fuel electrode 56a of the fuel cell 56 between the switching means 533 and the stop valve 541 before startup of the fuel cell 56 is as described below. In a case where a preceding shutdown has been made by the shutdown method described in Embodiment 7, the switching means 533 switches to the position for establishing communication between the reformer 51 and the fuel cell 56 when raw material gas finally passes through the fuel electrode 56a of the fuel cell 56. After the fuel cell 56 has been filled with raw material gas, the stop valve 541 is closed to enclose the raw material gas in the fuel electrode 56a of the fuel cell 56. A means of previously enclosing raw material gas can easily be realized in this manner.

As described above, the need for use of inert gas such as nitrogen even at a startup of the fuel cell 56 is eliminated to enable the installation space, the initial and running costs to be reduced.

(Embodiment 11)

Figure 9:
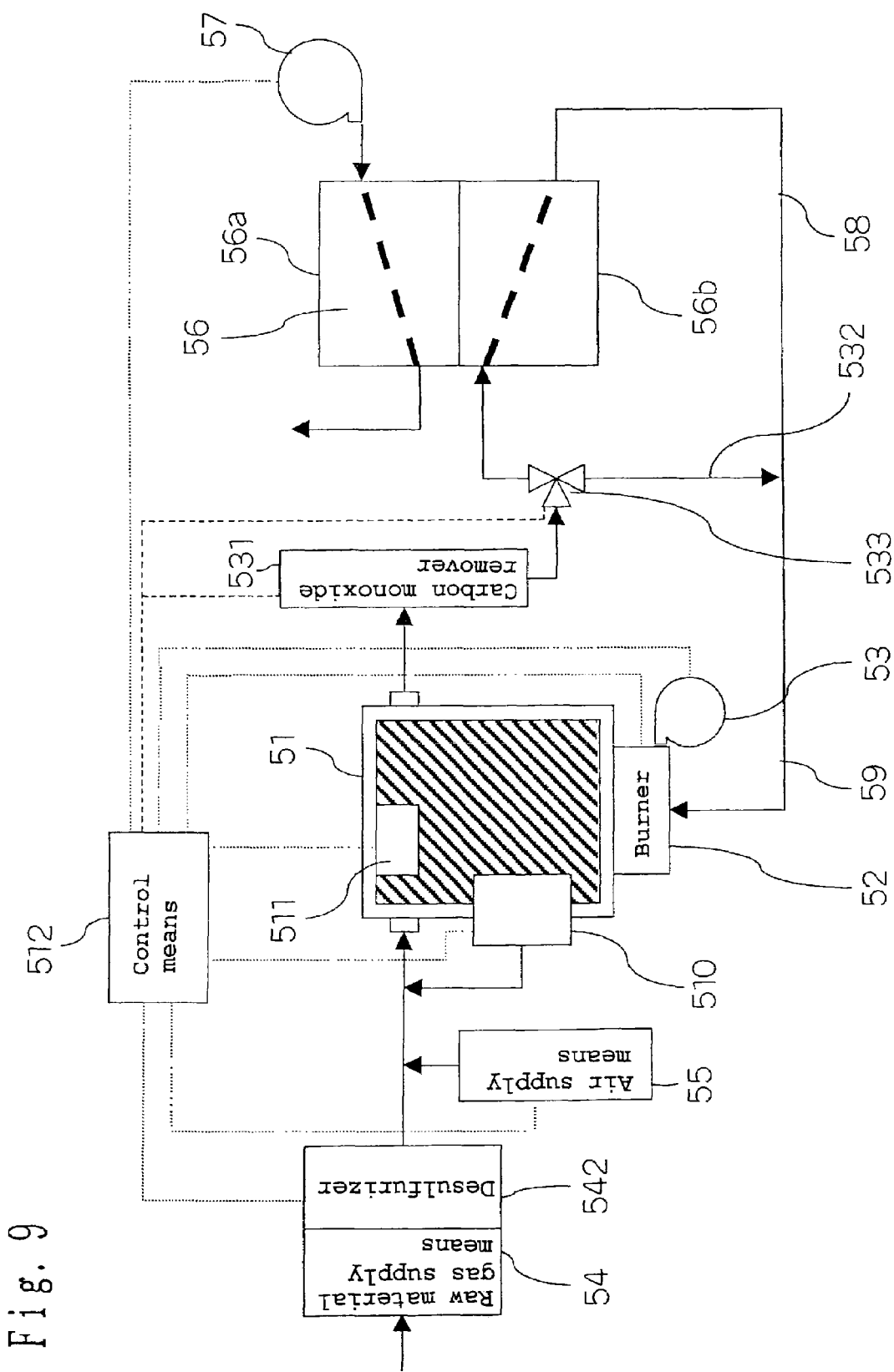
FIG. 9 is a diagram showing the configuration of a fuel cell power generation system in Embodiment 11 of the present invention.
Figure 10:
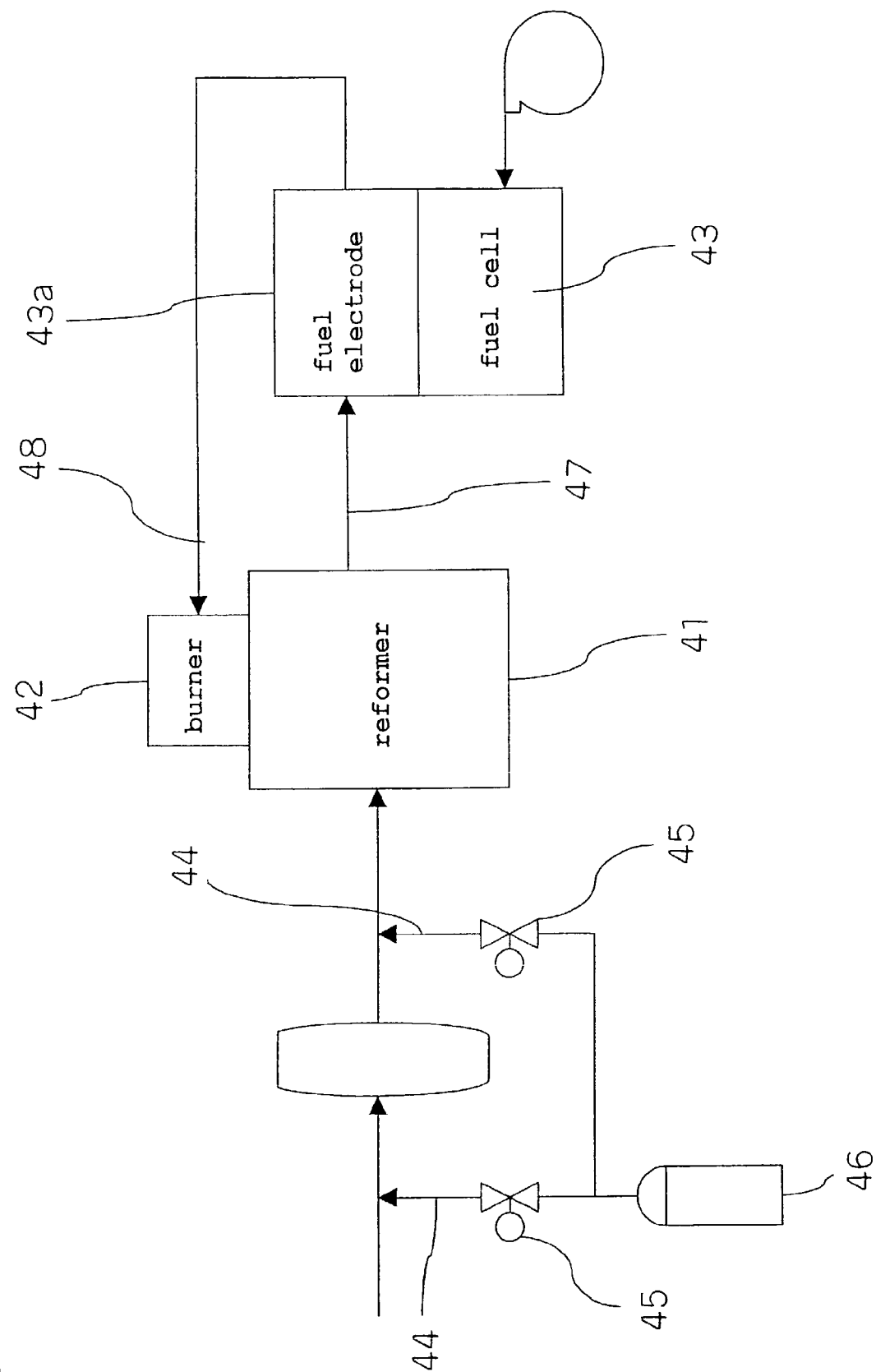
FIG. 10 is a diagram showing the configuration of a conventional fuel cell power generation system.

FIG. 9 is a diagram showing the configuration of a fuel cell power generation system in Embodiment 11 of the present invention. The same components as those in Embodiments 7 and 10 are indicated by the same reference characters and the description for them will not be repeated. The raw material gas supply means 54 is provided with a desulfurizer 542 which removes sulfuric components, e.g. an odorant component in raw material gas and plays a role in preventing the catalyst in the reformer 51, monoxide remover 531 and fuel electrode 56a of the fuel cell 56 from being poisoned with sulfuric components. This desulfurizer 542 may be used effectively in combination with any of the raw material gas supply means 54 in Embodiments 7 to 10.

In the startup and shutdown methods in Embodiments 7 to 10, raw material gas is supplied directly to the carbon monoxide remover 531 or to the fuel electrode 56a of the fuel cell 56. Therefore, if raw material gas contains sulfuric components, e.g., an odorant component, the desulfurizer 542 of this embodiment presents poisoning of the catalyst to maintain the desired performance.

Inventions which were made by the inventor of the present invention and which relate to the present invention will next be described.

In Embodiment 7 of the present invention, the burner 52 is an example of the temperature control means in the above-described inventions, the burner blower 53 is an example of the second air supply means of the above-described inventions, and the air supply means 55 is an example of the first air supply means of the above-described inventions. Also, the temperature sensor 511 corresponds to the temperature detection means in the above-described inventions.

In Embodiment 8 of the present invention, the gas supply means 521, the switching device 522, and the inlet 521a are an example of the supply channel of the above-described inventions.

In Embodiment 9 of the present invention, the switching means 533 and the bypass line 532 are an example of the channel shutoff means of the above-described inventions. However, the arrangement of the channel shutoff means of the above-described inventions is not limited to this example. The arrangement may alternatively be such that the bypass line 532 is removed, the switching means 533 switches to enable hydrogen rich gas from which carbon monoxide is not effectively removed to be released to the outside or temporarily accumulated. In short, any means suffices if it can shut off the hydrogen rich gas channel between the carbon monoxide remover 531 and the fuel cell 56 to prevent hydrogen rich gas output from the carbon monoxide remover 531 from being introduced into the fuel cell 56 before the carbon monoxide remover 531 becomes able to effectively remove carbon monoxide contained in hydrogen rich gas.

The configuration and operation of the fuel cell power generation system in each of Embodiments 7 to 11 of the present invention have been described as an example of the above-described inventions. However, the above-described inventions may be realized as a method of controlling a fuel cell power generation system, i.e., a method of controlling the operations of reformer 51, raw material gas supply means 54, air supply means 55, water vapor generator 510, burner 52, burner blower 53, and temperature detector 511. If the reformer 51 is a type of reformer not performing water vapor reforming, the water vapor generator 510 may be removed.

While the correspondence between the temperature control means of the above-described inventions and the burner 52, burner blower 53, and water vapor generator 510 has been mentioned, the temperature control means may be realized by using an electric heater, a cooling device, or the like. In such a case, the discharged gas supply line for heating the reformer may be removed from the fuel cell 56 or the carbon monoxide remover 531.

[Advantages of the Invention]

According to the present invention, the initial cost and the running cost of a fuel cell power generation system can be reduced.

What is claimed is:

1. A fuel cell power generation system comprising:
    a reformer which generates a hydrogen rich gas from a raw material by reforming reaction;
    raw material supply means of supplying the raw material to the reformer;
    temperature control means of controlling the temperature of the reformer so as to promote the reforming reaction;
    temperature detection means of detecting the temperature of the reformer;
    a fuel cell in which electric power is generated by using the hydrogen rich gas; and
    control means of controlling the operations of the reformer, the raw material supply means, the temperature control means and the fuel cell on the basis of the temperature detected by the temperature detection means, wherein
    when the operation of the fuel cell is stopped, the control means performs such control that the temperature of the reformer is equal to or lower than a predetermined temperature, while at least the raw material supply means is continuing supply of the raw material, and
    the predetermined temperature is a temperature at which the hydrogen rich gas is not generated or the hydrogen rich gas is generated in such an amount as not to react with air.

2. A method of controlling a fuel cell power generation system comprising a reformer which generates a hydrogen rich gas from a raw material by reforming reaction, raw material supply means of supplying the raw material to the reformer, temperature control means of controlling the temperature of the reformer so as to promote the reforming reaction, temperature detection means of detecting the temperature of the reformer, and a fuel cell in which electric power is generated by using the hydrogen rich gas, said method comprising a control process of controlling the operations of the reformer, the raw material supply means, the temperature control means and the fuel cell on the basis of the temperature detected by the temperature detection means, wherein
    in the control process, when the operation of the fuel cell is stopped, control is performed so that the temperature of the reformer is equal to or lower than a predetermined temperature, while at least the raw material supply means is continuing supply of the raw material, and
    the predetermined temperature is a temperature at which the hydrogen rich gas is not generated or the hydrogen rich gas is generated in such an amount as not to react with air.

3. The fuel cell power generation system according to claim 1, further comprising first air supply means of supplying air to the reformer; wherein
    after the continuation of the supply of the raw material is substantially completed, the control means performs such control that air from the first air supply means is supplied to the reformer and to the fuel cell.

4. The fuel cell power generation system comprising:
    a reformer which generates a hydrogen rich gas from a raw material by reforming reaction;
    raw material supply means of supplying the raw material to the reformer;
    temperature control means of controlling the temperature of the reformer so as to promote the reforming reaction;
    temperature detection means of detecting the temperature of the reformer;
    a fuel cell in which electric power is generated by using the hydrogen rich gas; and
    control means of controlling the operations of the reformer, the raw material supply means, the temperature control means and the fuel cell on the basis of the temperature detected by the temperature detection means, wherein
    the control means performs such control that the temperature of the reformer is equal to or lower than a predetermined temperature, while at least the raw material supply means is continuing supply of the raw material, before the operation of the fuel cell is started, and thereafter performs such control as to increase the temperature of the reformer above the predetermined temperature and to start the operation of the fuel cell, and
    the predetermined temperature is a temperature at which the hydrogen rich gas is not generated or the hydrogen rich gas is generated in such an amount as not to react with air.

5. The fuel cell power generation system according to claim 3 or 4, wherein
    the temperature control means includes a burner and second air supply means of supplying air for combustion to the burner, and
    the control means sets the rate of supply of air to the burner of the second air supply means to an excessively high value to achieve the control for maintaining the temperature equal to or lower than the predetermined temperature.

6. The fuel cell power generation system according to claim 5, wherein the burner combusts exhaust gas from the fuel cell or the reformer.

7. The fuel cell power generation system according to claim 1 or 4, further comprising a second burner which combusts exhaust gas from the fuel cell or the reformer.

8. The fuel cell power generation system according to claim 1 or 4, wherein
    the temperature control means includes water vapor supply means of supplying water vapor to the reformer,
    the reformer conducts the reforming reaction by water vapor reforming, and
    the control means sets the rate of supply of water vapor to the reformer of the water vapor supply means to an excessively high value to achieve the control for maintaining the temperature of the reformer equal to or lower than the predetermined temperature.

9. The fuel cell power generation system according to claim 1 or 4, further comprising:
    a carbon monoxide remover which is provided between the reformer and the fuel cell, and which removes carbon monoxide contained in the hydrogen rich gas generated by the reformer; and
    channel shutoff means of shutting off the channel between the carbon monoxide remover and the fuel cell,
    wherein when the operation of the fuel cell is started, the control means performs such control that the hydrogen rich gas output from the carbon monoxide remover is not introduced into the fuel cell before the carbon monoxide remover becomes able to effectively remove carbon monoxide contained in the hydrogen rich gas after the temperature of the reformer has been increased above the predetermined temperature.

10. The fuel cell power generation system according to claim 9, wherein the control means performs such control that the raw material is supplied into the fuel cell before the system starts operating, and performs such control that the channel shutoff means shuts off the channel after the raw material has been enclosed in the fuel cell.

11. The fuel cell power generation system according to claim 3, wherein the raw material supply means and the first air supply means have a common supply channel connected to the reformer, and the supply channel is switched so that the raw material is supplied to the reformer when the supply channel is used as a portion of the raw material supply means, and the supply is switched so that the air is supplied to the reformer when the supply channel is used as a portion of the first air supply means.

12. The fuel cell power generation system according to claim 1 or 4, further comprising desulfurizing means provided between the raw material supply means and the reformer.

13. A method of controlling a fuel cell power generation system comprising a reformer which generates a hydrogen rich gas from a raw material by reforming reaction, raw material supply means of supplying the raw material to the reformer, temperature control means of controlling the temperature of the reformer so as to promote the reforming reaction, temperature detection means of detecting the temperature of the reformer, and a fuel cell in which electric power is generated by using the hydrogen rich gas, said method comprising a control process of controlling the operations of the reformer, the raw material supply means, the temperature control means and the fuel cell on the basis of the temperature detected by the temperature detection means, wherein in the control process, control is performed so that the temperature of the reformer is equal to or lower than a predetermined temperature, while at least the raw material supply means is continuing supply of the raw material; before the operation of the fuel cell is started, and thereafter is performed as to increase the temperature of the reformer above the predetermined temperature and to start the operation of the fuel cell, and the predetermined temperature is a temperature at which the hydrogen rich gas is not generated or the hydrogen rich gas is generated in such an amount as not to react with air.

* * * * *